June 29, 1965
HUGH L. DRYDEN
DEPUTY ADMINISTRATOR OF THE
NATIONAL AERONAUTICS AND
SPACE ADMINISTRATION
LUNAR LANDING FLIGHT RESEARCH VEHICLE
Filed June 26, 1963
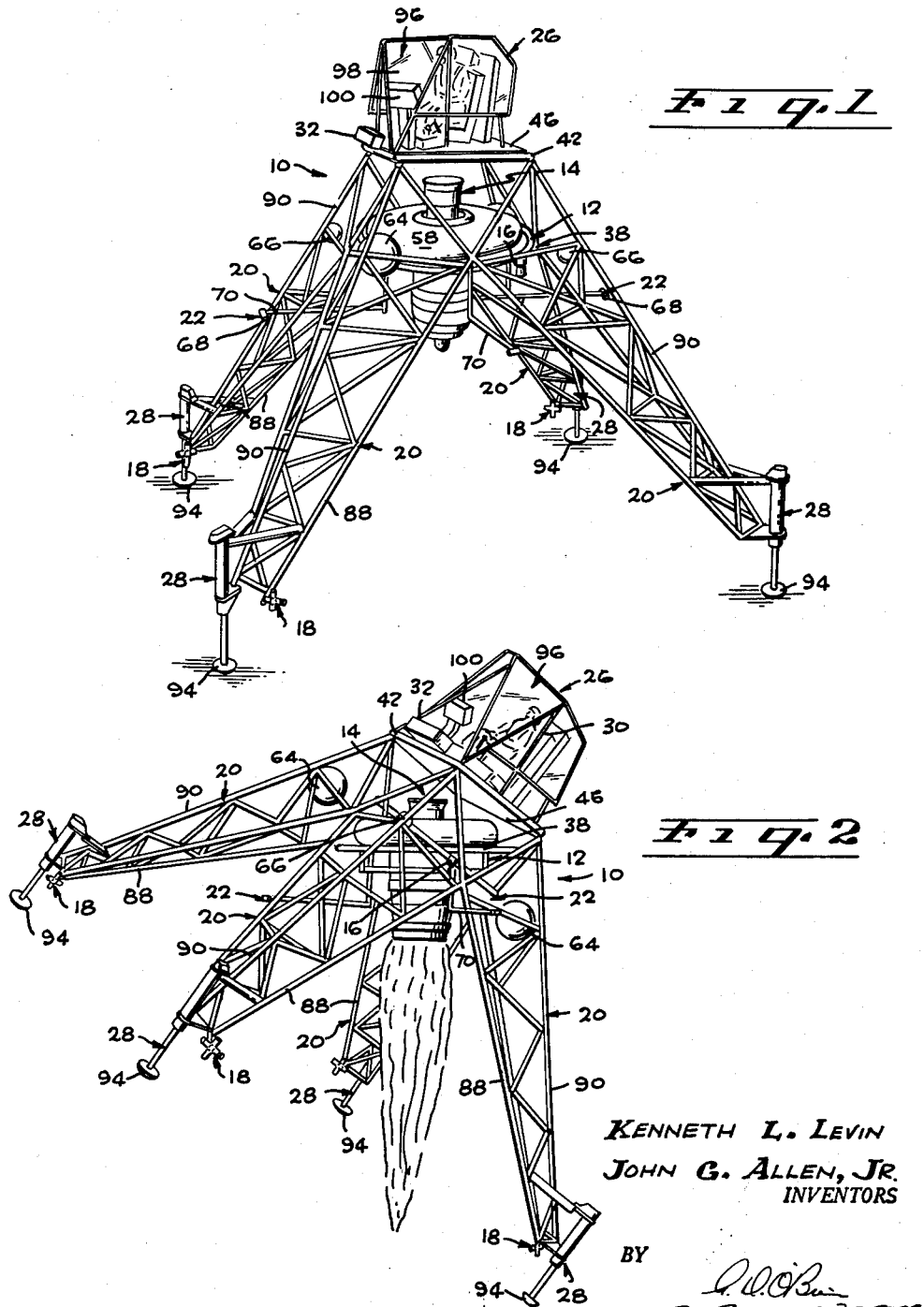
KENNETH L. LEVIN
JOHN G. ALLEN, JR.
INVENTORS
BY
ATTORNEYS

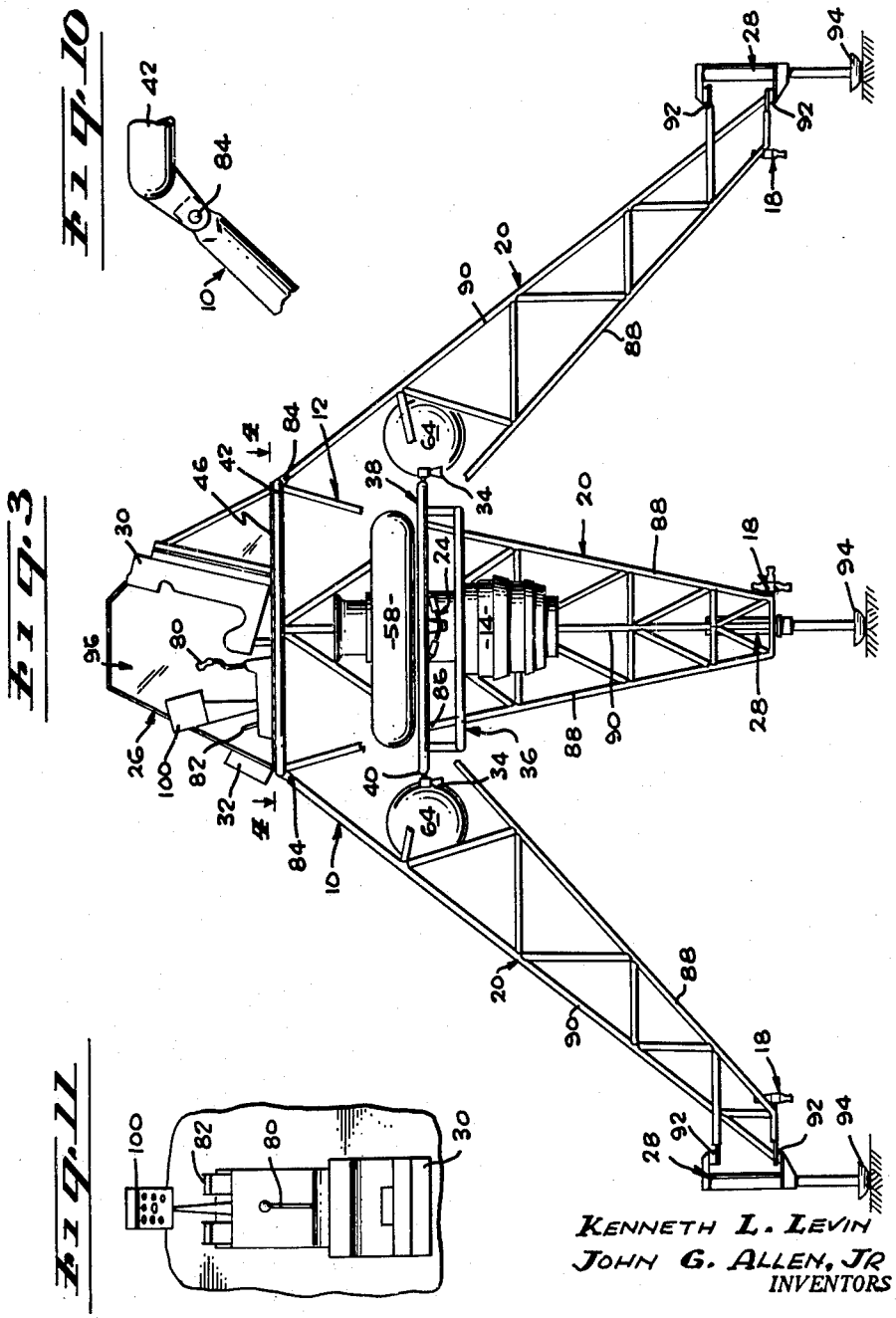

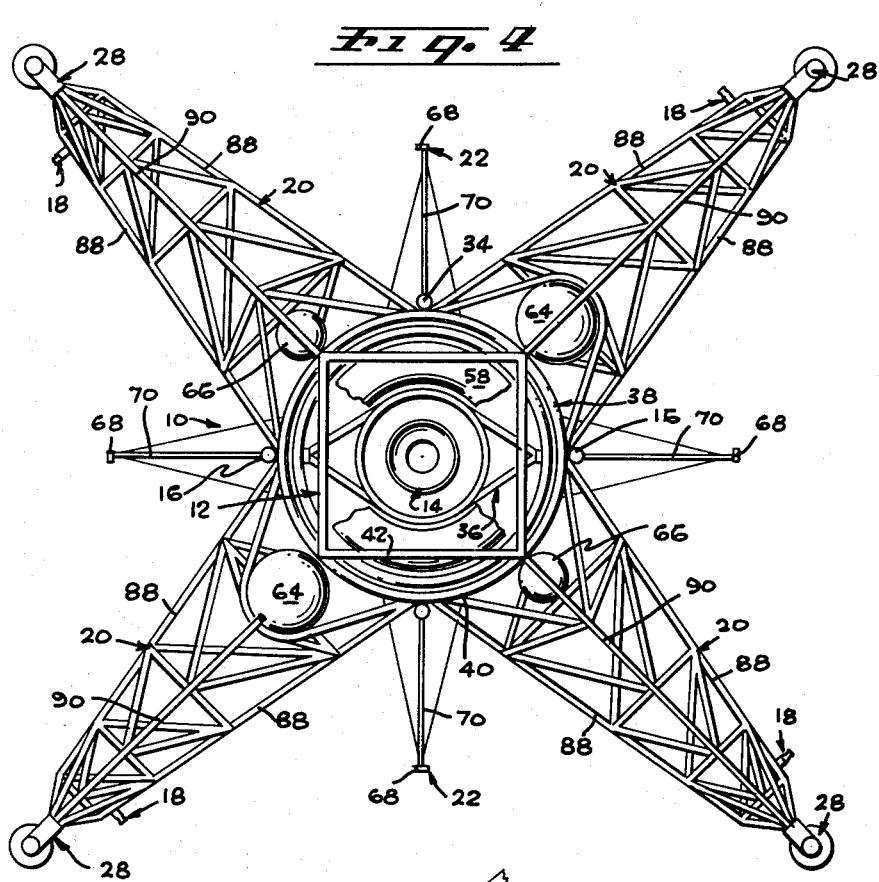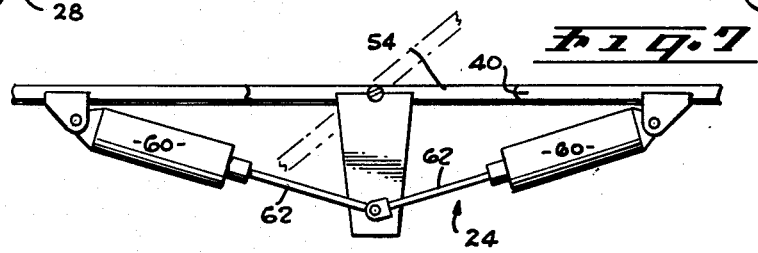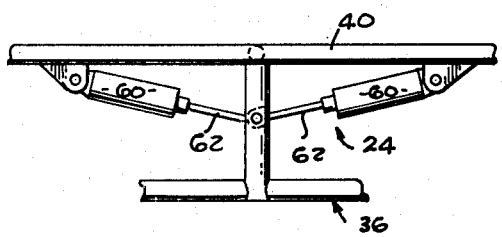

KENNETH L. LEVIN
JOHN G. ALLEN, JR
INVENTORS

BY

ATTORNEYS

June 29, 1965

HUGH L. DRYDEN
DEPUTY ADMINISTRATOR OF THE
NATIONAL AERONAUTICS AND
SPACE ADMINISTRATION
LUNAR LANDING FLIGHT RESEARCH VEHICLE 3,191,316

Filed June 26, 1963

KENNETH L. LEVIN
JOHN G. ALLEN, JR.
INVENTORS

BY

ATTORNEYS 3,191,316
LUNAR LANDING FLIGHT RESEARCH VEHICLE
Hugh L. Dryden, deputy administrator of the National Aeronautics and Space Administration, with respect to an invention of Kenneth L. Levin and John G. Allen, Jr.
Filed June 26, 1963, Ser. No. 290,868
5 Claims. (Cl. 35—12)

The invention described herein may be manufactured and used by or for the Government of the United States of America for governmental purposes without the payment of any royalties thereon or therefor.

This invention relates to a flight research vehicle employed for the purpose of simulating lunar landings where gravitational influences are approximately one-sixth those on earth, and aero-dynamic forces are substantially non-existent, and more particularly this invention relates to a lunar landing flight research vehicle which includes: (a) a main lift engine having more than an adequate amount of thrust to overcome five-sixths of the earth gravity, (b) main lift rockets for countering the remaining one-sixth earth gravity so that a realistic simulation of lunar approach, hovering and touchdown may be achieved, (c) vehicle attitude controls for controlling the the attitude of the vehicle, including vehicle tilt during horizontal translation which is a maneuver required of an actual lunar landing vehicle, (d) engine attitude controls for controlling the attitude of the engine so the latter is in a substantially vertical position at all times to properly counteract earth gravity, (e) landing gear structure which is so disposed as to provide a realistic lunar landing touchdown and which provides for avoiding vehicle capsizing during lateral translation and touchdown, (f) safety and recovery system for recovering the vehicle pilot and vehicle with a minimum of harm and damage in the event catastrophic events occur which threaten either the pilot or vehicle or both and (g) a cockpit and cockpit display positioned on the vehicle so as to provide a reasonable representation of conditions occurring in a lunar vehicle. The foregoing structure and equipment when considered in combination is for the purpose of exploring and solving the hereinafter identified problems involved in making an actual lunar landing, and which will evaluate pilot ability and contribute to pilot training.

The lunar exploration program will encounter new and unusual environments which are unfamiliar and foreign to our presently developed knowledge of flight operations. Typical of the problems to be encountered is the lunar approach, hover and touchdown. For conventional air breathing aircraft a vast amount of information and knowledge is available, but for lunar landing craft no such information and knowledge exists.

Two characteristics of the lunar environment are basic to the design of a free flight vehicle which can simulate lunar landing trajectories on earth. First, the low lunar gravity, which is about one-sixth that of earth, and second, the lunar atmospheric pressure, which is about $10^{-13}$ mm. of mercury and causes no appreciable aerodynamic forces on the lunar landing vehicle. For realistic earth simulation, a free flight test vehicle should provide first a means of reducing the effects of earth gravity while preserving similarity of vehicle mass and moment of inertia, and second, a means of balancing aerodynamic forces so that the vehicle appears to operate in a vacuum environment. In providing this simulation, the test vehicle should not itself introduce unrealistic side effects. This can be accomplished only by designing the research test vehicle in a manner so that the attitude of the thrust vector which balances earth gravity and aerodynamic drag can be adjusted independently of the attitude and motion of the basic vehicle. The response of the vehicle to attitude controls and rocket lift engines is then preserved and realistic flight situation can be simulated.

Because of the two aforementioned characteristics of the lunar environment, a number of problems are presented which require solution and which are: (1) control with no aerodynamic damping, (2) effects of low lunar gravity, (3) pilot position visibility, (4) control system characteristics, (5) determination of pilot landing display parameters and their instrumentation, (6) landing tipover problems due to low gravity, (7) control of vehicle translation, (8) control of lift rockets, (9) control of attitude rockets, and other problems of equal if not greater importance.

The nine preceding problems are hereinafter related in greater detail and each problem for purposes of continuity will be identified by the respective number given above.

(1) The actual lunar vehicle will involve for the first time a pilot controlled landing operation in which no aerodynamic forces exist. As such, current specification for control characteristics and handling which has been accepted by pilots and other personnel do not apply to lunar landing, and in resolving this problem the seven lettered components, previously identified, will be employed.

(2) New definitions are needed for operation in lunar gravity where hovering thrust to mass ratio its considerably different, and accompanying rate of climb, rate of sink or descent, and translation capability are significantly changed. The solution to this problem will also be achieved by the use of all seven lettered components.

(3) Item (g) will provide a means of investigating cockpit or capsule requirements of an actual lunar vehicle since the actual lunar vehicle configuration and pilot position may not represent the most ideal for vehicle control. An investigation is required into the extent to which the position of the pilot and the restraints imposed upon him from the pressure suit and from the seat will effect his capability to control the vehicle. If the pilot seating is such that the pilot sits upright with the vehicle in normal flight attitude, during the landing phase he may be flying on his back with his feet in the air. Experiments have shown that if the pilot's seat is rotated forward about 45°, the pilot is in a position whereby he can exercise reasonably good control. However, space limitations of a lunar vehicle may not permit rotation of the seat, thus requiring the pilot to control the vehicle from a generally reclining position. Not only will the pilot be controlling from this position, he will also be encumbered with a pressure suit which will further restrict his capability for making precise movements. Finally, there may also be some influence occurring from sensory inner ear conditions and resulting from the necessity of controlling the vehicle from an atypical or abnormal body position.

The investigation of viewing techniques on controllability should take into account the visual environment in which the vehicle will be operated. This includes natural as well as induced characteristics of the environmental filled. The natural characteristics include brightness, glare, contrast, texture and color. The induced environment includes changes in the visual environment resulting from the presence of the vehicle, such as glowing dust and other impingment effects. With these characteristics in mind, a thorough investigation of both direct and indirect viewing techniques need be accomplished. Investigation of direct viewing techniques should include configuration, i.e., size, shape and position of windows as well as optical anomalies, i.e., position and motion distortion and the optical characteristics of the window.

The indirect viewing techniques include periscopes, closed loop television, radar, infra-red techniques and optical systems. The variables of interest include the size of the visual field, the number of degrees that can be scanned, the viewer characteristics, location of viewers and controls with respect to the pilot, resolution, signal to noise ratio and distortion.

(4) Control problems include the determination of the most effective type of control system, i.e., a control system that utilizes acceleration commands, rate commands or position commands to control vehicle attitude. Consideration should also be given to fail-safe requirements for the control system. Thus items (c) and (d) will be used together with the pilot controls located in item (g) to study and solve this problem.

(5) Since the lunar landing represents a rather unique vehicle control situation, a thorough investigation of the pilot landing display parameters and instrumentation should be undertaken. This should include determination of what information should be displayed, how the information should be displayed, the requirement for quick-ended displays and/or predictor type displays. The instrumentation display in item (g) will provide the best means for resolving this problem.

(6) The precison required for control of the vehicle at touchdown will be much greater for lunar landing than for the landing of a comparable vehicle on earth. This results from the large increase in tipping tendencies due to change in relationship between vehicle inertia and static restoring moment due to gravity. This raises serious questions as to the most effective means of presenting information to the pilot that will enable him to exercise precise control. Again item (g) will be used, but information transmitted to the instrumentation display in item (g) will be presented by items (a) through (d).

Also, the requirements for stability on the design of lunar landing gear need be given serious consideration and attention, which relates, obviously, to item (e).

(7) Horizontal translation or travel of a rocket supported vehicle can be accomplished by tilting the entire vehicle and its rocket engines to provide a horizontal component of thrust. Translation may also be accomplished by using horizontally mounted auxiliary thrusters. It can be shown that tilting of the entire vehicle is more economical in use of propellants. However, for hovering on the moon the vertical thrust vector is only one-sixth that required on earth, whereas the horizontal thrust vector needed for lateral acceleration is the same as that required on earth, so that vehicle tilt angle may be very large. For example, to translate a thousand feet and come to a stop within thirty seconds requires a tilt angle of approximately 40°. This raises questions of man's ability to stabilize vehicle attitude while in a 40° tilt and complicates the problem of providing good visibility of the terrain below and around him and resolution of this problem will be achieved particularly through the employment of items (a), (b), (c), (d) and (g).

(8) Vertical thrust vector magnitude should be controlled precisely in order to accomplish vehicle touchdown at essentially zero vertical velocity which, of course, calls for the use of items (a) and (b).

(9) Vehicle attitude control can be provide by gimballing the main lift rockets, or by use of auxiliary reaction control rockets which are identified above as items (b), (c) and (d) respectively.

Although particular items of the vehicle have been identified as contributing to the solution of the various problems, it is to be understood that the identification of the particular items was for the purpose of providing clarity and that the solution to the problems collectively or individually is not entirely dependent on or exclusively restricted to the items identified.

Thus, it is an object of this invention to provide a lunar landing flight research vehicle embodying components which in combination and individually will provide apparatus for experimentally exploring and contributing to the solution of the aforementioned identified problems.

This and other objects of the invention will become more apparent from a consideration of the description which follows taken in conjunction with the drawings.

FIG. 1 is a perspective view of the lunar landing flight research vehicle while at rest.

FIG. 2 is a perspective view of the vehicle while in a flight maneuver, illustrating the position of the jet engine while in use, and illustrating the employment of a vehicle attitude rocket.

FIG. 3 is a vertical sectional view of the lunar landing flight research vehicle while at rest, a leg being removed to clarify the arrangement of internal structure.

FIG. 4 is a horizontal sectional view taken on line 4—4 of FIG. 3.

FIG. 7 is a side elevational view illustrating gimbal locking mechanism, structure being broken away to disclose details of gimbal ring structure, and gimbal ring structure being shown in phantom line to disclose the position assumed during certain flight maneuvers.

FIG. 8 is a plan elevational view of the structure shown in FIG. 7.

FIG. 9 is a perspective view of the jet engine and auxiliary equipment, the toroidal fuel tank being broken away to disclose location and details of structure.

FIG. 10 is a schematic detail view illustrating the manner of attaching the landing gear legs to the platform.

FIG. 11 is a view illustrating generally the arrangement of the instrument console within the capsule.

Figure 5:
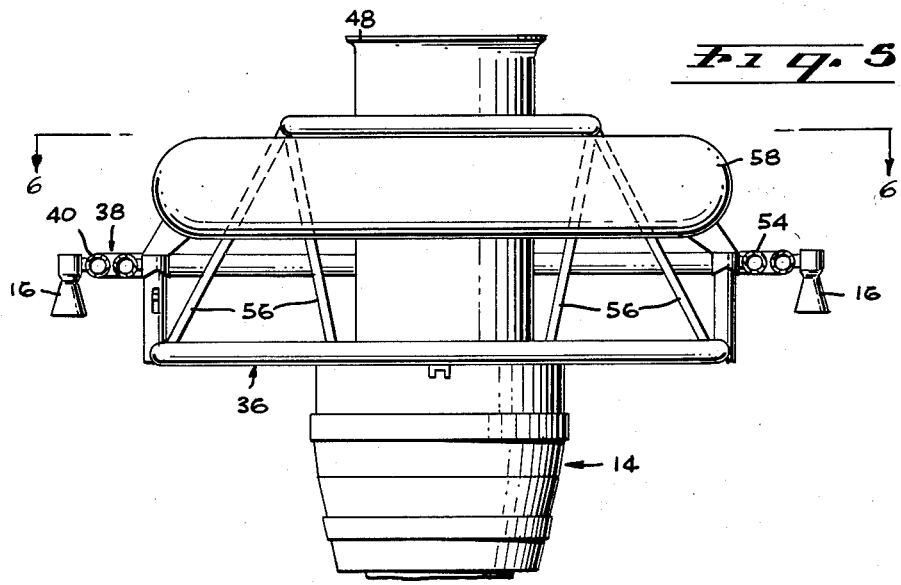
FIG. 5 is an enlarged view of the jet engine and structure associated therewith.

The primary mission of the lunar landing flight research vehicle 10, illustrated particularly in FIGS. 1–4 is to accomplish basic research on lunar landing problems as an aid in the design and development of manned lunar landing vehicles. A major objective of the lunar landing flight research vehicle is to determine the levels of control power and damping that is necessary and desirable for actual piloted soft lunar landing missions. Control power is the power required to achieve vertical and horizontal flight, and damping is the flight attitude necessary to achieve approach, hover and touchdown.

Lunar landing flight research vehicle 10, hereinafter identified simply as vehicle or simulator 10, embodies an airframe wherein conventional materials, standard sizes, and conventional manufacturing techniques are employed. The simple truss work design provides performance capabilities adequate for the initial research tasks to be accomplished.

The simulator structure includes a cage-like platform 12, which is in surrounding relationship to a turbo-jet main lift engine 14.

Basic to the design of simulator 10 is the aforementioned lift engine 14 which counteracts five-sixths of earth gravity. The remaining one-sixth earth gravity will provide downward acceleration equal to lunar gravity acceleration.

Actual lunar vehicles will be supported by throttleable lift rockets 16. Thus, for accurate simulation, the thrust/mass/gravitational force ratios should be the same for simulator 10 on earth as would occur on the moon. In other words, the thrust imposed on vehicle 10 should be comparable to that required to be employed on the moon; the mass of vehicle 10 should be in proper proportion to that of the thrust so as to accurately provide a vehicle comparable to an actual lunar vehicle; and the gravitational force factor to be considered with the preceding two factors should be comparable to that of the moon.

It is possible to provide additional lift to overcome the remaining one-sixth gravity by means of lift engine 14, but because the actual lunar vehicle will employ lift rockets, lift rockets 16, mounted on platform 12, are provided so as to produce a lift system that is as nearly like that to be employed in actual use as possible, and which will counter the downward lunar acceleration so that a "zero-G" touchdown on landing may be achieved.

Additionally, lift rockets 16 provide a horizontal component of thrust when platform 12 is tilted. In other words, lateral translation or travel of simulator 10 is accomplished by tilting the vehicle and hence tilting the thrust vector or direction of thrust of the lift rockets.

Since the moon is without an atmosphere of any particular magnitude and has a gravity one-sixth that of earth, the attitude of the vehicle during approach, hover and touchdown is of particular significance, and therefore, a vehicle attitudte system is provided which incorporates considerable versatility for controlling the attitude of the vehicle and its flight characteristics. The vehicle attitude system includes a redundant cruciform arrangement of a series of pilot operated rockets, jets or nozzles 18 mounted adjacent the ends of landing gear legs 20.

It is these jets which when operated achieve tilting of the vehicle. Although the vehicle attitude rockets are arranged in cruciform fashion, the yaw rockets may be mounted on the landing gear legs 20 in the plane of the vertical center of gravity of vehicle 10. Since a conventional fuselage or airframe and related components are not shown, legs 20 may also be considered the airframe for the reason that a considerable number of the identified components and those to be identified are mounted directly on or are supported by legs 20.

The vehicle attitude system is part of a broad stability and control system which includes an engine vertical stabilization or attitude system which is comprised of a series of engine supported bleed air jets 22 which contribute to maintaining engine 14 in a proper vertical lift attitude. An alternative for controlling the engine attitude is to substitute a servosystem for bleed air jets 22.

The vehicle stabilization system and engine stabilization system complement each other to the extent that they provide mutual backup or optional support for each other for greater vehicle safety in the event of failure of one of the systems, which will hereinafter be considered in greater detail.

Figure 6:
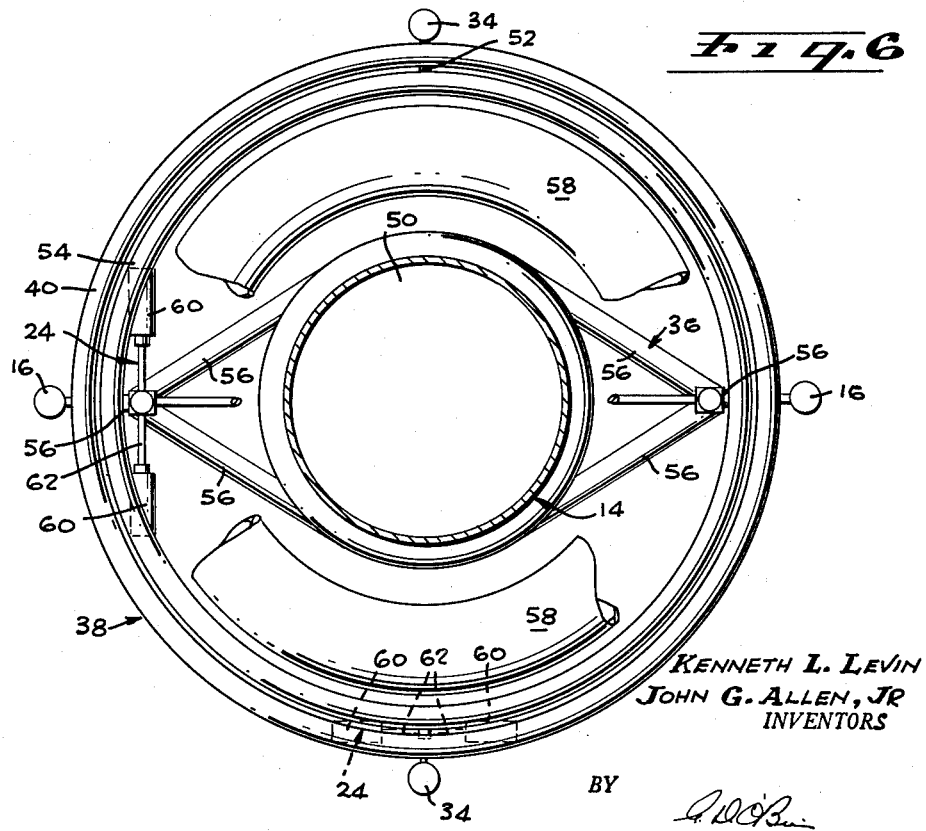
FIG. 6 is a horizontal, sectional view, partially in elevation taken on line 6—6 of FIG. 5, structure being broken away to clarify the location and details of structure.

At the discretion of the pilot, engine 14 can be rigidly aligned to platform 12 in the neutral position by gimbal locking equipment 24, see FIGS. 6-8, and the attitude of the entire vehicle controlled by rockets 18. Gimbal locking equipment 24 will also hereinafter be identified as the gimbal caging and locking equipment or the gimbal centering system.

The cockpit or capsule 26 layout and arrangement of equipment as well as its location on vehicle 10 is such as to provide the maximum forward, lateral and downward visibility. In order to achieve maximum downward visibility, pilot location in cockpit 26 is arranged so that landing gear legs 20 do not interfere.

Landing of the simulator is, of course, required and in the form of simulator shown, the landing gear includes a plurality of the aforementioned legs 20, each of which has a shock absorber 28 on the terminal end thereof so that a touchdown may be made on relatively flat or relatively uneven terrain.

Finally, since simulator 10 is in reality earthbound and failure of engine 14 is possible, although remote, provisions are required for safety recovering the pilot, and if at all possible, the simulator, without either suffering substantial harm or damage. The preferred recovery system includes an ejection seat 30 in cockpit 26, a parachute mounted in a container 32 on platform 12 and retrorockets 34 also mounted on platform 12 similar to lift rockets 16.

All systems on the vehicle for controllability and maneuverability are redundant with the exception of engine 14, and all the aforementioned identified equipment is mounted on platform 12 or landing gear legs 20 except engine 14 and bleed air jets 22. The bleed air jets are, as related, supported by the engine, and the engine is in turn supported by an engine mount 36, see particularly FIGS. 5, 6 and 9.

Vehicle 10 is attached to engine 14 through a two-axis gimbal ring assembly 38, best seen in FIGS. 5, 6 and 9, which provides for pivotal movement of engine 14 in the pitch and yaw axes, but not in the roll axis and which effectively isolates vehicle pitch and roll attitude motion from jet engine motions.

The structure of the aforementioned platform 12 is a tubular truss cage of aluminum alloy. Main members of platform 12 are a lower ring frame member 40 which is vertically spaced from an upper square or rectangular frame member 42, see FIGS. 1-4, and the aforementioned gimbal axis is in the plane of ring 40. Frame members 40 and 42 are connected by vertical and diagonal support members extending from the corners of square frame member 42 to strategic locations around the circumference of ring frame member 40, thus forming a cage. The top of the cage is closed by cockpit floor 46 which is in the plane of square frame member 42, but the bottom of the cage is open to permit engine 14 to project through.

If vehicle 10 is tilted when a change in heading is commanded, the engine attitude controls, i.e., bleed air jets 22, will maintain verticality of engine 14 by applying moments about the pitch and roll gimbal axes. The engine thrust vector is nominally vertical except for the tilt required to compensate for the lateral drag force, i.e., atmospheric interference, on simulator 10.

Each of the major identified components of simulator 10, such as engine 14, main lift rockets 16, stability and control system, landing gear, cockpit 26, and the recovery system, will hereinafter be considered in greater detail with there being related structural details, individual mode of operation, and mode of operation of individual components in combination with other related components.

A final summary will relate the manner of employing the various components of the simulator under varying conditions. The summary will also relate briefly some of the conditions which occur and which need to be compensated for by the stability and control system represented by bleed air jets 22 and vehicle attitude rockets 18.

*Main lift engine*

Numerous pertinent factors exist which influence the choice of main lift engine 14, such as a requirement for a relatively small size, realistic simulation, overall economy, and efficiency. As a result, it is preferred that main lift engine 14 be a by-pass or fan type turbojet which combines the best elements of jet and propeller operation. Since lift engine 14 is a by-pass type turbojet engine, it includes a pair of inlets, an uppermost turbojet intake 48 and a turbofan intake 50, the latter being spaced vertically downwardly from intake 48, see particularly FIGS. 5, 6 and 9. The two inlets permit locating the gimbal axes so that the moments due to momentum drag of each inlet offset each other to a large degree. However, other main lifting methods may be employed such as a helicopter lift by direct gimbal coupling to the vehicle, helicopter lift by gimbal-and-tether coupling, ducted fan, and liquid fueled rocket engine.

While for lunar simulation jet engine 14 need provide a lift equal only to five-sixths of the gross weight of vehicle 10, the jet engine should have a maximum continuous thrust slightly in excess of the total gross weight of simulator 10 so that it can be used independently for vehicle take-off and for emergency landing. In addition, the jet engine, mounted as it is, compensates for vehicle aerodynamic drag by tilting of the thrust vector. A single engine configuration is presently preferred over a dual engine configuration in order to increase vehicle reliability.

and eliminate the problem of matching performance ratings of pairs of engines. However, a dual or twin engine configuration is entirely feasible, and as the number of vehicle occupants increase and vehicle weight increases, the configuration may evolve to twin engines.

Vertical mounting of the engine is preferred in order to eliminate thrust loss and developmental problems inherent in thrust diverters. However, it is to be understood that the engine or engines can be mounted so as to employ diverters or other applicable equipment.

In order for the jet engine thrust vector to counteract five-sixths of earth gravity, the thrust vector should pass through the vehicle center of gravity and remain substantially vertical, regardless of vehicle attitude. This requires that the jet engine be mounted on the aforementioned gimbal ring assembly 38 which is as related, a two-axis gimbal, and that the vehicle center of gravity be located at the intersection of the gimbal axes. This will provide neutral static stability which means that unrealistic side effects will be minimized. Gimbal assembly 38 is provided with the aforementioned caging and locking equipment 24, seen best in FIGS. 7 and 8, which will effectively lock the jet engine rigid to the vehicle 10 and which will hereinafter be considered in greater detail. Gimbal assembly 38 includes a pair of diametrically opposed gimbal axle housings 52 which are affixed or secured to ring frame member 40 to provide for attachment of a gimbal ring 54. Gimbal ring 54 is preferably a formed steel tube containing four sets of gimbal bearings, one pair being disposed in axle housings 52 and one pair being disposed in hubs 56. The sets of gimbal bearings disposed in axle housings 52, to which platform 12 is attached, form an outer gimbal. The inner gimbal is formed by the remaining two sets of gimbal bearings disposed in hubs 56 to which engine mount 36 is attached.

The vehicle has been designed to provide for about 40° angular freedom in both axes of gimbal assembly 38 between engine 14 and vehicle 10. In other words, engine 14 and vehicle 10 may be tilted in either or both pitch and yaw direction about 40° relative to each other. This allows substantially 10° tilt of the engine to counteract vehicle drag induced by atmospheric interference and 30° tilt of the vehicle to accomplish horizontal translation or travel.

Jet engine 14 is supported on gimballed engine mount 36 which is arranged so as to produce a minimum of interference with the operation of engine 14. Engine mount 36, preferably, is a welded unit fabricated of carbon steel tubing, utilizing a plurality of restraint engine mounting points 56 which collectively serve to restrain engine 14 in all three axes, i.e., pitch, roll and yaw. This type of mounting allows for thermal expansion of the engine.

Aerodynamic drag, i.e., atmospheric interference, and pitching moments, i.e., the magnitude of directional forces produced on the engine during horizontal translational flight result from two sources. One is the drag and pitching moment produced by the momentum change due to turning the air into turbojet intake 48 and the other is that due to the external drag of the engine and its components. Of these, the drag and moments due to momentum change are much greater.

The aerodynamic moments for a gimbal axis located at the engine center of gravity are fairly large and positive. Therefore, the gimbal axis location is above the engine center so as to reduce aerodynamic moments and thus optimize the sum of aerodynamic and inertial moments. Thus the center of gravity of engine 14 tends to maintain or contributes to maintaining the engine in a vertical position.

An added advantage appears to occur from placing the gimbal axis above the engine center of gravity. That is, in the event of an engine stabilization failure, the engine system will be statically stable about a poistion aligned with the capsule 26 vertical centerline.

Installation of engine 14 in the illustrated configuration will not materially affect the basic engine performance.

As before related, engine mount 36 pivots on gimbal ring assembly 38 and the latter pivots on ring frame member 40 of platform 12. These two pivot axes are at substantially right angles, and in the neutral position they are both horizontal, thus permitting engine 14 to be tilted in any direction relative to platform 12 up to the aforementioned angle of about 40° from the vertical. In actual flight, engine 14 is maintained in a vertical attitude by either the caging and locking mechanism 24 or by the engine attitude system represented by bleed air jets 22, and platform 12 is tilted to simulate motion of an actual lunar landing vehicle which tilts to translate.

Fuel for engine 14 is contained in a compartmented toroidal tank 58, which is supported by engine mount 36 and disposed vertically above the gimbal ring assembly 38. Radial compartmentation of tank 58 is employed so as to provide a plurality of equal segments, preferably four, to minimize center of gravity shift.

Because of the shape of tank 58, use of the fuel will not materially affect the vehicle center of gravity. Additionally, compartmenting tank 58 reduces surging of the fuel so the center of gravity of the vehicle is not unnecessarily affected. Although a toroidal fuel tank is illustrated, it is to be understood that compartmented cylindrical tanks may also be employed. Also entirely applicable are spherical fuel tanks which may be compartmented to minimize center of gravity shift.

Fuel flow from tank 58 may be so arranged that the fuel supply will remain substantially equally distributed between the compartments.

During take-off of vehicle 10, or in the event of malfunction of the aforementioned bleed air jets 22, engine 14 is generally caged by the aforementioned gimbal centering and locking mechanism 24.

The centering and locking mechanism comprises two pairs of helium actuated cylinders 60, see FIGS. 6, 7 and 8, one pair pivotally mounted on ring 40 adjacent to one of the outer gimbal bearings. The cylinder piston rods 62, the free ends of which are connected to the respective gimbal bearings, are free floating until pressure is applied through a solenoid operated tri-port valve, not shown. An adequate substitute for helium would be nitrogen, and other gases which are substantially inert at normal atmospheric temperatures.

Thus, it may be seen that main engine 14, and the related components heretofore identified, are employed primarily for the purpose of achieving vertical translation or travel of vehicle 10. However, main lift engine 14 and the related components also contribute particularly to the solution of problems (1), (2), (6), (7) and (8).

Horizontal or lateral translation of vehicle 10 is accomplished by the use of hereinafter described lift rockets 24.

*Lift rockets*

The main lift, throttleable thrust rockets 16 together with retro-rockets 34 are vertically trunnion mounted on ring frame member 40 within the upper trusswork of two opposite landing gear legs 20 immediately below gimbal axle housings 52. Further, rockets 16 and retro-rockets 34 are centered on the vertical center of gravity of simulator 10 so as to provide as dynamically stable a simulator as possible.

Propellant for all rockets including vehicle attitude rockets 18 is supplied from a pair of spherical propellant tanks 64 containing $H_2O_2$ (hydrogen peroxide). The propellant tanks, of aluminum or other applicable materials, are mounted on the vehicle struts fore and aft of cockpit 26. On the other hand, tanks 64 may be mounted outside the truss structure, between pairs of legs 20. However, specific location of the tanks is not critical as long as they are placed in pairs opposite each other and approximately in the plane of the vertical center of gravity or in the plane of the aforementioned gimbal axis in order to prevent excessive shift in center of gravity of simulator 10 as propellant is consumed.

To reduce the flow of propellant from one sphere to another during translation of simulator 10 in which the simulator is tilted, restraining orifices, not shown, are located between the tanks or spheres.

Either of the two peroxide spheres 64 can be isolated, and control of the vehicle maintained using propellant in the other sphere. Pilot operated push-pull valves employed to achieve the isolation are usually open.

Although a hydrogen peroxide propellant system is at this time preferred, it is to be understood that a bipropellant system using nitrogen tetroxide and hydrazine is entirely applicable. As a matter of fact, a bipropellant system has at least one advantage over that of the hydrogen peroxide system which is that the operating time for a bipropellant system provides almost twice that of the hydrogen peroxide system.

As before related, propellant tanks 64 for rockets 16 and retro-rockets 34 are located within the trusswork of a pair of opposite landing gear legs 20 or outside the trusswork and between pairs of legs. Mounted within the trusswork of the other pair of legs 20 or outside the trusswork and between the other pair of legs is a pair of diametrically opposed helium spheres 66, also trunnion mounted, for pressurization of the propellant system.

The helium system, completely redundant for attitude system capacity, includes two titanium spheres; although other materials are considered suitable. The pilot has direct control over the use of the helium gas, thus providing for pressurizing peroxide tanks 64 slowly to minimize impact stresses on the propellant feed system.

Even though main lift engine 14 is capable of independently vertically lifting simulator 10, main lift rockets 16 together with retro-rockets 34 are also capable of achieving the same performance. In order for the simulator 10 to properly accomplish the desired results it is necessary that horizontal translation also be achieved and such an achievement is accomplished by employment of rockets 18. Contribution to horizontal translation is made when employing the stability and control system which includes vehicle attitude rockets 18 and bleed air jets 22.

Thus it may be seen that lift rockets 16 contribute particularly to the solution of problems (1), (2), (6), (7), (8) and (9). Also it may be seen that discrete use of retro-rockets 34 will contribute to the solution of the same problems and the retro-rockets will also contribute to the recovery system.

Stability and control system

The operational requirements of the stability and control system is to:

(1) Tilt the simulator 10,
(2) Stabilize the attitude of jet engine 14,
(3) Compensate for drag and changes in vehicle weight, and
(4) Provide adjustable stability to the vehicle attitude control system represented by rockets 18.

Engine attitude system

The engine attitude stabilization system for jet engine 14 represented by bleed air jets 22 provides the reaction moments needed to counteract the following moments and disturbances on the jet engine:

(a) Thrust misalignment with the center of gravity,
(b) Lateral vehicle maneuvering accelerations acting on the engine center of gravity (which is below the gimbal center line),
(c) Drag moments resulting from air flow into the engine inlet,
(d) Engine gyroscopic moments,
(e) Vehicle maneuvering torques transmitted through gimbal friction, and
(f) Dynamic unbalance about the two gimbal axes.

The attitude control system for engine 14 is capable of deflecting the engine approximately ±10° from the vertical about two perpendicular axes in the horizontal plane to enable it to compensate for drag effects.

Jet engine vertical stabilization is provided by utilization of jet engine compressor bleed air in four downward facing nozzles 68, each of which is at the terminal end of a wire supported orthogonal extension 70 located in a horizontal plane so as to provide the desired torque, see FIG. 9. Airflow from these nozzles is gyro controlled with conventional gyros mounted on engine 14. More particularly, nozzles 68 are servocontrolled to a vertical gyro, reference 72, and to the pilot's engine attitude controller. Electrical signals from the vertical gyro pitch and roll transducers 74 and 76 and from the controller are shaped in the engine electronic package 78 to drive an electric actuator which controls the bleed air nozzle openings.

However, vertical stabilization of jet engine 14 may also be provided by a gyro controlled servomechanism as before mentioned.

Since the aforementioned caging and locking mechanism 24 effectively locks jet engine 14 to vehicle 10, bleed air is not required during take-off of vehicle 10, and therefore during this period nozzles 68 are not employed. As a result, full engine thrust for substantially vertical lift is available.

Components of the jet stabilization system including valved ducts (not shown) and the aforementioned nozzles 68 are secured to the engine mount 36.

Vehicle stabilization system

A vehicle attitude control system or a vehicle stabilization system has been selected which can be used in a variety of ways to simulate a broad spectrum of control methods. The system provides attitude control in pitch, roll and yaw with pure couples, i.e., no translation accompanies a change in attitude. For instance, the vehicle attitude control system, represented by rockets 18, provides the pilot with the capability of tilting simulator 10 plus or minus 30° about the pitch and roll axes and rotating the simulator 360° about the yaw axis.

The need for providing torque without translation requires four nozzles for each plane of control (i.e., two roll left and two roll right). Therefore, twelve units total are required. The yaw units, however, are not located in the plane of the simulator centroid. Hence, four additional nozzles are required to prevent cross couples when only one of the two yaw nozzles is operable. The four additional nozzles, plus the twelve previously mentioned, brings the total number of vehicle attitude control nozzles to sixteen. This effect is discussed in greater detail in the following section concerning flight safety.

The vehicle attitude system of sixteen nozzles is divided into two identical hydrogen peroxide reaction jet subsystems each containing eight nozzles which are mechanically and electrically linked to the pilot controls. Manually controlled push-pull valves provide a system to permit isolating either bank of eight units in the event of valve failure. Either subsystem can be used alone although translation would accompany a change in attitude, thus requiring a greater degree of pilot skill.

The aforementioned manual control system includes the pilot control stick 80 and foot pedals 82, see FIGS. 3 and 11, which are valve connected to meter hydrogen peroxide in the pitch, roll and yaw reaction jets 18. The system also includes the lift rocket throttle which is a valve connected to meter hydrogen peroxide to the lift and retro-rockets 16 and 34, respectively.

Vehicle stabilization is achieved with the aforementioned sixteen thrust attitude control rockets 18 which are fired in pairs and mounted adjacent the lower ends of landing gear legs 20. However, as aforementioned, a pair of vehicle attitude control rockets may be vertically mounted on the lower end of each leg inboard of the landing shock strut 28, and a pair of vehicle attitude control rockets may be horizontally mounted on each leg 20 substantially at the center of gravity of simulator 10.

Propellant for vehicle attitude rockets 18 will be supplied from the aforementioned propellant tanks 64.

However, in the present vehicle, lateral translation is accomplished by tilting vehicle 10 with rockets 18 so that lift rockets 16 provide a horizontal component of thrust. Alternatively, such a lateral translation could be accomplished by means of a fixedly mounted horizontal rocket. This would be accomplished by attaching to the vehicle one additional thrust chamber substantially identical to those used as lift rockets. It would be mounted horizontally in the plane of the center of gravity, facing rearward, and a separate throttle control could also be provided.

By discreetly using the vehicle stabilization system, simulator 10 may be adjustably tilted to achieve horizontal translation which will compensate for drag and changes in vehicle weight. Thus, it may be seen that the stability and control system comprising vehicle stabilization system and engine attitude system contribute to the solution of problems (1), (2), (4), (6), (7) and (9).

Landing gear

The preferred length of the landing legs 20, illustrated in FIGS. 1–4, cause the vehicle center of gravity to fall at the intersection of the aforementioned gimbal axes. This leg length also provides adequate clearance from the jet engine exhaust to the ground to prevent ground erosion.

Four landing legs 20 are provided, but it is to be understood that three legs may also be employed, and a kit may be provided with the vehicle for so modifying the number of legs. However, in the event three legs instead of four are used the length of each of the legs is required to be longer to compensate for the tipover angle of vehicle 10. For instance, for a fixed vehicle tipover angle, it has been determined that the three-legged configuration requires that each leg be about 41% longer than for a four-legged configuration.

In order to accommodate unevenness of landing terrain with four legs, each leg has been provided with one of the aforementioned relatively long stroke shock struts or absorbers 28.

Legs 20 are preferably, releasably connected and radiate outwardly from the periphery of platform 12 by pin joints 84, illustrated in FIG. 10, so as to achieve easy removal of the legs. Removal of legs 20 will render vehicle 10 easily transportable by truck or cargo aircraft. For instance, pin fittings illustrated positionwise by numeral 86, in FIG. 3, integral with lower ring frame member 40, are provided for attachment of the two lower main members or longerons 88 on each leg 20, and pin joints 84 are provided at each corner of frame member 42 for attachment of the upper main member or longeron 90.

Although legs 20 are shown as being rigid, they may be jointed in strategic regions. Additionally, legs 20 have been described as providing for a releasable but rigid attachment to platform 12. Legs 20 are angularly disposed with respect to the vertical axis of simulator 10 so as to avoid capsizing the simulator on landing. An alternative structural feature would be to pivotally attach legs 20 to platform 12, the pivotal attachment incorporating a shock absorber as a substitute for the upper longeron.

Each leg 20 is preferably a tapered triangular truss of welded aluminum alloy tubing which is defined by the aforementioned longerons 88 and 90. However, it is to be understood that the legs may have a different configuration from that shown, and the material used in the fabrication of the legs may be a material or materials other than that identified. For instance, instead of the legs having a tapered triangular truss configuration, each may be a single tube.

Legs 20 include the aforementioned vertical shock struts, or shock absorbers 28, there being one on the end of each leg. The attachment of each strut to the respective leg includes spaced elastomer shear pads or shock mounts 92, seen best in FIG. 3, in an arrangement which permits horizontal deflection of dish-shaped landing foot 94 at the lower end of the shock strut, and which absorbs lateral energy during landing. The combination of shock absorbers 28 and landing feet 94 affords realistic landing simulation. However, the shock struts may be rigidly mounted on legs 20.

The design of the vertical shock struts 28 is dictated by the desire to produce a relatively small ground reaction factor, i.e., rebound, while still accommodating the static ground conditions. In order for struts 28 to function properly, they should not be fully compressed when two diagonally opposite legs are supporting a fully loaded vehicle nor fully extended when all four legs are supporting an empty vehicle.

Legs 20 may be further modified to provide for an adjustable angle with respect to the vehicle 10 so as to increase or decrease tipover stability. For instance, the upper section of longeron 90 could be of adjustable length and pin connected at both ends.

Adjustable fittings attaching shock absorbers 28 to the legs would compensate for the change in angle when landing legs 20 are adjusted.

The present vehicle rests at the same angle as the terrain on which it stands. However, if it is considered desirable to have the vehicle remain in a vertical position in spite of landing on hilly or sloping ground, shock absorbers 28 may be modified so as to incorporate a load leveling device. The load leveling device would consist of a relatively long stroke hydraulic piston and cylinder on each leg. The four cylinders would then be manifolded to allow oil to flow between cylinders. As the legs contact the ground, they adjust themselves to uneven terrain until the last leg touches down. At this point, energy would be absorbed by compression of a standard shock absorber connected to the hydraulic circuit. After the vehicle has come to rest, valves to each cylinder would be closed, thus hydraulically locking the leveling devices so as to hold the vehicle in the vertical position with all four legs firmly in contact with the ground.

Thus, it may be seen that the landing gear contribute to the solution of problems (1), (2) and (6).

Cockpit

The pilot enclosure or cockpit 26, illustrated in FIGS. 1–3, consists of a semiclosed compartment structurally defined by suitable framework and a transparent protective screen 96 which provides essentially a 360° field of view, and the cockpit floor 46 is comprised of preferably removable panels of lightweight honeycomb sandwich construction so that access may be had to engine 14 to perform repairs and the like.

The protective screen includes a windshield 98 and side panels which may be hinged so as to permit the pilot to enter the cockpit.

Protective screen 96 is suitably rigid or stiff to prevent undue vibration or flapping from interfering with pilot mission. A preferred material for protective screen 96 is tinted mylar or thin plexiglass or some other suitable transparent material.

If the color of the protective screen is one color and the pilot uses glasses of an opposite color, limited window area can be simulated. For instance, if the protective screen is tinted orange except for a selected area which is clear and transparent, and the pilot wears glasses which are blue, the tinted region of the protective screen becomes entirely opaque while the untinted region remains transparent. When the pilot removes the glasses the optical phenomenon is no longer effective and the pilot has full viewability.

The enclosure is preferably open at the top so that nothing will interfere with pilot ejection in the event such a condition develops. However, a jettisonable canopy may cover the enclosure so as to protect the occupant or occupants of the cockpit against rain and other adverse weather conditions. Ejection of the pilot is achieved with the aforementioned zero attitude, zero velocity rocket type ejection seat 30.

Primary pilot manual control shall be installed in cockpit 26 of the simulator 10 which includes the aforementioned aircraft type center mounted stick 80 which is valve connected as previously mentioned, and rudder pedals 82 which are installed as a unit to facilitate relocation for dual seat configuration, and which are also valve connected as aforementioned. A conventional jet engine throttle left hand operated, not shown, and lift rocket throttle, also not shown, are to be included. Actuation of the jet engine gimbal lock is achieved by actuation of a switch, not shown, on the control stick.

Disposed in cockpit 26 is a helicopter type instrument panel or display 100 which is removably installed on the center line of platform 12. Instrument panel 100 includes the usual type instruments such as airspeed indicator, altimeter, rate of climb indicator, fuel level indicator, etc. To be included in the instrument display is jet and rocket engine and fuel instruments.

The entire display panel 100 is removable as a package to facilitate installation of advanced display systems, and each indicator is removable from the panel for servicing and minor modifications.

Panel 100 is constructed so that additional display instruments may be added as deemed necessary.

Control stick 80 actuates certain of rockets 18 and thereby commands proportional pitch attitude accelerations when moved fore and aft, and proportional roll attitude accelerations when moved laterally. Motions of pedals 82 actuate certain of rockets 18 to thereby command proportioned yaw attitude accelerations.

Although cockpit 26, as illustrated, provides for the accommodation of a single occupant, some tasks require a second occupant. Therefore, cockpit 26 may be modified to accommodate a second occupant. Thus, it may be seen that the cockpit contributes to the solution of problems (1), (2), (3), (4), (5), (6) and (7).

Every precaution has been taken to provide a reliable simulator 10 which will perform the desired function to achieve a specific number of results. However, even though catastrophic malfunction of the various components of simulator 10 is remote, recognizing the fact that malfunction may occur requires that precautions be taken to insure pilot safety. Because simulator 10 is a relatively expensive vehicle, provisions are included in the structure of the simulator for recovering the simulator with as little damage as possible. These features of reliability and safety are hereinafter described in the following section.

*Reliability and safety*

In the event of catastrophic failure of simulator 10, pilot safety is provided by the aforementioned zero altitude, zero velocity ejection seat 30. However, saving vehicle 10 is also desirable. In order for the vehicle to accomplish an emergency landing under its own power, minimum requirements are that the vehicle stabilization rockets 18 and jet engine system 14 be operating. Redundancy in the form of nozzles 18 and bleed air jets 22 has been provided for vehicle and jet engine stabilization. However, in the absence of a vehicle recovery system, loss of jet engine 14, lift and retro-rockets 16 and 34 respectively will result in loss of the simulator 10.

The preferred system employed for recovering the vehicle in the event of failure of jet engine 14 is a drogue chute mounted in container 32 which may be located on the forward portion of a platform 12 which serves to retard down acceleration of the vehicle until retro-rockets 34 can be fired. Provision may be included in the vehicle recovery system whereby the drogue chute and retro-rockets are actuated automatically. However, the recovery system may also be manually actuated.

Another recovery system considered applicable is the use of a large parachute.

The preferred recovery system has an advantage over other recovery systems, however, for the reason that the recovery equipment can be strategically located to cause a minimum shift of vehicle center of gravity.

It can be seen that if the recovery system is made fully automatic it can be effective whether the pilot stays with vehicle 10 or not.

Another facet of vehicle safety also concerns jet impingement effects and the influence the jet exhaust will have on other components of simulator 10 such as vehicle attitude rockets 18.

Experience has shown that all the effects of jet impingement are influenced by the distance between exhaust nozzle and ground, by the quality of the ground surface, the temperature and kinetic energy of the jet at ground level, and by time.

Since the air contained by the exhaust of engine 14 will have a relatively low velocity and will meet with very little resistance from the largely open framework structure of simulator 10, significant adverse or harmful ground effects will not occur.

The jet impingement phenomena is most pronounced at takeoff or touchdown. The distance between ground and exit plane of the simulator's annular jet is about four times the outside diameter of this jet. At this distance the velocity in the composite jet decreases appreciably so that under most conditions ground erosion does not occur.

The aforementioned composite jet consists of two parts: a hot inner jet and a much colder outer jet.

Therefore, no debris will be formed by the engine exhaust of simulator 10 when operated above a hard surface such as conventional runway surfaces. Operation over sod without significant surface damage or debris formation is considered entirely applicable.

Consideration must be given to the effect the engine exhaust will have on other simulator components, and it has been found that the engine exhaust and induced flows are considerably decelerated by the time these arrive into proximity of the reaction jets 18. The exit velocity of the latter is several orders higher than that of the engine exhaust. Therefore, no significant deflection of the reaction control jets occurs.

And another feature to consider is the effect the engine exhaust might have on engine 14 since in vertical descent of simulator 10, the engine will be moving into a zone of its own exhaust. It has been found that ingestion of exhaust-polluted air into engine 14 is not considered to cause any adverse effects.

Thus, it may be seen that the reliability and safety system contributes to the solution of problems (1) and (2).

*Summary*

Following is a summary, relating the mode of operation of the various heretofore identified components, and describing in more extensive detail the relationship of the mode of operation of one or more components with respect to another.

Jet engine thrust is controlled by programming the setting of the jet engine throttle to maintain the forementioned thrust to weight ratio of five-sixths as jet and rocket propellants are expended. Simulator vertical drag component is compensated by measuring drag and commanding throttle change to compensate.

Gimbal locking equipment on the two gimbals provide a capability of flying and landing simulator 10 in the following modes:

(1) Jet engine lift only with gimbals caged or uncaged,
(2) Jet engine plus rocket lift with gimbals uncaged, and
(3) Emergency locking modes.

all the lift, as identified in (1) above, permits the conservation of rocket fuel during the portions of flight which do not require simulation of lunar conditions. Operation in this mode of flight can also be used as a backup in the event of failure of lift rockets 16.

With the gimbals caged, the attitude of jet engine 14 can be controlled with the hydrogen peroxide reaction jet attitude control rockets 18. Lateral translation is accomplished by tilting the vehicle with selected rockets 18, and therefore, the thrust vector of engine 14. Vertical translation is accomplished by pilot control of the engine throttle. The engine attitude bleed air jets 22 can be used instead of hydrogen peroxide jets 18 to control vehicle attitude.

The engine attitude bleed air jets 22 are capable of imparting angular accelerations on engine 14 and vehicle 10 about the pitch and roll axes, but control about the yaw axis in this mode would still be with the hydrogen peroxide reaction jets 18.

With the gimbals uncaged, as identified in (1) above, jet engine 14 is stabilized to the vertical by engine attitude bleed air jets 22 and the attitude of simulator 10 is controlled with the hydrogen peroxide jets 18. Lateral translation is accomplished by pilot control of the engine attitude bleed air jets 22. Vertical translation is by pilot control of the engine throttle.

Operation with the jet engine 14 supporting five-sixths the vehicle weight and the lift rockets 16 supporting the remaining one-sixth of the weight, as identified in (2) above, is used when lunar gravity and vacuum conditions are simulated.

In this mode of operation the gimbals are uncaged. The throttle of jet engine 14 is automatically controlled about the five-sixths-G nominal setting to compensate for changes in vehicle weight and for the vertical drag force on vehicle 10. The engine attitude bleed air jets 22 automatically tilts the engine about the pitch and roll axes to compensate for lateral drag on the vehicle. The pilot operates the hydrogen peroxide jets 18 to tilt the vehicle which also tilts the lift rockets to accomplish lateral translation. Vertical translation is accomplished by pilot control of the lift rocket throttle.

In the event of failure in the lift rocket system, the pilot shuts down the lift rocket system and takes over control of the jet engine throttle to initiate emergency modes which is identified as (3) above. Flight then continues under jet engine control.

Should a failure occur in the hydrogen peroxide control system, the pilot shuts down the failed system and continues to operate with the redundant hydrogen peroxide system.

Should a failure occur in the engine attitude bleed air jets system, the pilot shuts down the system, cages the gimbals and continues to operate with the hydrogen peroxide control system.

A failure in engine 14 requires the pilot to initiate emergency measures which means that lift rockets 16 and retro-rockets 34 are required to be activated, and in the event these rockets are inadequate to prevent catastrophe, then the extreme measure must be followed with the pilot ejecting himself via ejection seat 30 from simulator 10.

The overall stability and control system, identified as the engine bleed air jets 22 and vehicle attitude rockets 18 provides reaction moments needed to counteract the following moments and disturbances:

(1) Jet thrust misalignment with the center of gravity at nominal thrust, (2) Lateral accelerations from engine tilt acting on the vehicle center of gravity, (3) Drag moments resulting from center of pressure not being at the center of mass, (4) Dynamic unbalance because of asymmetrical configuration, (5) Engine tilt torques transmitted through gimbal friction, and (6) Unbalance thrust from lift rockets 16.

Normal takeoff and climb to mission altitude is accomplished with the engine gimbals caged in the manner previously related. During mission simulation jet engine 14 is throttled and vectored to provide a vertical component of thrust equal to five-sixths of the vehicle weight, and the force necessary to overcome the total aerodynamic force acting on the simulator. The aerodynamic force consists mainly of a drag force opposite in direction to velocity.

In normal operation, vehicle 10 will descend from its initial altitude to a position on or near the ground. During this mode of flight, it is necessary only to reduce the engine throttle setting to adjust for drag force which in descending flight is tending to support the simulator. The only factor of importance is to initiate deceleration in sufficient time to avoid a hard impact. Normally, since a lunar landing is being simulated, the vehicle will be brought to a hovering condition with lift rockets 16, while the jet engine throttle is controlled to maintain thrust equal to five-sixths vehicle weight.

The rocket systems including lift rockets 16, attitude rockets 18 and retro-rockets 34 on simulator 10 are required to provide a good simulation of the lift rockets and attitude control rockets which would be employed on an actual lunar landing vehicle.

While the present invention has been described herein in what is considered to be a preferred embodiment thereof, it should be recognized that departures may be made therefrom within the scope of the invention, and it should therefore not be limited to the details of the within disclosure, but should be accorded the full scope of the appended claims.

What is claimed is:

1. A flight research vehicle for simulating flight in a lunar environment comprising, in combination:
   (a) an airframe that includes a landing gear framework and an operator's capsule;
   (b) an engine mounting framework gimbal mounted to said landing gear framework so as to permit pivotal movement of said engine mounting framework about a first axis with respect to said landing gear framework;
   (c) an operator throttled jet engine gimbal mounted in said engine mounting framework to permit pivotal movement of said jet engine about a second axis normal to the first axis;
   (d) air bleed jets mounted to said engine mounting framework and connected to said jet engine for controlling the thrust direction thereof when operating;
   (e) control means mounted on said airframe for sensing the direction of thrust of said jet engine and actuating said air bleed jets to maintain the direction of thrust from said jet engine exactly vertical and downward with respect to the center of gravity of the vehicle, whereby said jet engine can be throttled to a point where the thrust generated thereby will overcome approximately five-sixths of the earth's gravitational pull on said vehicle;
   (f) a plurality of operator throttled lift rockets attached to said engine mounting framework in a fixed position;
   (g) said lift rockets having a substantial thrust capability which, when operating in conjunction with said jet engine, can be throttled to overcome more or less than one-sixth of the earth's gravitational pull; whereby, when said jet engine is generating a thrust equal to five-sixths earth's gravitational pull, the lift rockets can be employed to move the vehicle in a gravity condition very similar to that which would be encountered in a lunar landing; and
   (h) attitude control rockets attached to said landing gear framework for controlling the attitude of said airframe and thus the thrust direction of said lift rockets which are fixed thereto, whereby said airframe can be tilted to control the horizontal and vertical movement of said vehicle.

2. A flight research vehicle as recited in claim 1 wherein:
(a) said landing gear framework includes a plurality of equally spaced leg members that support said vehicle when landed;
(b) each of said leg members having a shock absorbing mechanism mounted at the lower extremity thereof to absorb any shocks encountered during landing of said vehicle.

3. A flight research vehicle as recited in claim 2 wherein:
(a) said attitude control rockets attached to said landing gear framework comprises a plurality of rockets attached to each leg member at the lower extremity thereof.

4. A flight research vehicle as recited in claim 3 wherein:
(a) said engine mounting framework is mounted to said landing gear framework in a position between said leg members and intermediate the extremities thereof.

5. A flight research vehicle for simulating flight in a lunar environment comprising, in combination:
(a) an airframe that includes four landing gear legs and an operator's capsule mounted on the upper ends of said landing gear legs;
(b) an engine mounting framework gimbal mounted to said landing gear legs intermediate the extremities thereof so as to permit pivotal movement of said engine mounting framework with respect to said airframe about a first axis;
(c) an operator throttled jet engine gimbal mounted in said engine mounted framework to permit pivotal movement of said jet engine about a second axis normal to the first axis;
(d) air bleed jets mounted to said engine mounting framework and connected to said jet engine for controlling the thrust of said jet engine when operating;
(e) control means mounted on said airframe for sensing the direction of thrust of said jet engine and actuating said air bleed jets to maintain the direction of thrust from said jet engine exactly vertical and downward with respect to the center of gravity of the vehicle, whereby said jet engine can be throttled to a point where the thrust generated thereby will overcome approximately five-sixths of an earth's gravitational pull on said vehicle;
(f) a plurality of operator throttled lift rockets attached to said engine mounting framework in a fixed position;
(g) said lift rockets having a substantial thrust capability which, when operating in conjunction with said jet engine, can be throttled to overcome more or less than one-sixth of the earth's gravitational pull; whereby, when said jet engine is generating a thrust equal to five-sixths earth's gravitational pull, the lift rockets can be employed to move the vehicle in a gravity condition very similar to that which would be encountered in a lunar landing; and
(h) attitude control rockets attached to said landing gear legs for controlling the attitude of said airframe and thus the thrust direction of said lift rockets which are fixed thereto, whereby said airframe can be tilted to control the horizontal and vertical movement of said vehicle.

References Cited by the Examiner
UNITED STATES PATENTS

| | | | |
|---|---|---|---|
| 2,639,582 | 5/53 | Pearlman | 60—35.55 |
| 2,850,977 | 9/58 | Pollak | 60—35.55 X |
| 2,936,973 | 5/60 | Kappus | 244—23 |
| 3,070,329 | 12/62 | Hasbrouck | 244—52 |

OTHER REFERENCES

"Aviation Week," vol. 67, No. 5, Aug. 5, 1957, page 51 relied upon.

"Missiles and Rockets," vol. 10, No. 20, May 14, 1962, page 3 relied upon.

JEROME SCHNALL, *Primary Examiner.*

LAWRENCE CHARLES, *Examiner.*